May 21, 1968 MASAHISA MIYAGI 3,384,822

FREQUENCY-SHIFT-KEYING PHASE-MODULATION CODE TRANSMISSION SYSTEM

Filed March 19, 1965 2 Sheets-Sheet 1

INVENTOR
MASAHISA MIYAGI

BY
Hopgood & Calimafde
ATTORNEYS

May 21, 1968 MASAHISA MIYAGI 3,384,822

FREQUENCY-SHIFT-KEYING PHASE-MODULATION CODE TRANSMISSION SYSTEM

Filed March 19, 1965 2 Sheets-Sheet 2

INVENTOR
MASAHISA MIYAGI
BY
Hopgood & Calimafde
ATTORNEYS

United States Patent Office 3,384,822
Patented May 21, 1968

3,384,822

FREQUENCY-SHIFT-KEYING PHASE-MODULATION CODE TRANSMISSION SYSTEM

Masahisa Miyagi, Tokyo, Japan, assignor to Nippon Electric Company Limited, Tokyo, Japan, a corporation of Japan Filed Mar. 19, 1965, Ser. No. 441,223
Claims priority, application Japan, Mar. 21, 1964, 39/15,540
9 Claims. (Cl. 325—30)

ABSTRACT OF THE DISCLOSURE

A code transmission and receiving system of high transmission efficiency which employs a transmitter for frequency-shift-keying code transmission of at least two carrier frequencies whereby a plurality of codes is transmitted as a single code, and a receiver for demodulation in which a reference signal is produced and employed for synchronization detection.

This invention relates to a frequency-shift keying code transmission system wherein phase-modulation or phase and amplitude-modulation is employed. More particularly, the invention relates to such a system wherein synchronization detection may be performed without the automatic phase control or similar operation that has been conventionally employed for maintaining synchronism in a transmission system wherein code modulation is achieved by means of amplitude, phase, or frequency techniques.

Throughout the description of the invention, the following abbreviations will be employed: FSK will be used to indicate frequency-shift-keying, PSK will be used to refer to phase-shift-keying, FSK–PM will be used to indicate frequency-shift-keying phase-modulation, and FSK–PM–AM will be used to refer to frequency-shift-keying phase and amplitude-modulation.

Synchronization detection has seldom been employed with FSK-modulated waves because it has been difficult to obtain synchronizing signals satisfactory for use in demodulation. This difficulty exists because the carrier frequency is caused to vary among a plurality of frequencies with time according to the coded signals being transmitted, and none of the plurality of carrier frequencies employed is used continuously. Furthermore, the transmission efficiency of the code transmission systems now employed is undesirably low.

Accordingly, it is an object of the invention to provide a synchronization detection system for an FSK modulated wave system wherein a pluraity of waves is employed in a non-continuous manner.

It is another object of the invention to provide a code transmission system of high transmission efficiency wherein a reference signal is produced and utilized in the receiver part of the system for synchronization detection.

All of the objects, features and advantages of this invention and the manner of attaining them will become more apparent and the invention itself will be best understood by reference to the following description of an embodiment of the invention taken in conjunction with the accompanying drawing, in which—

Figures 1, 2, 3, 4:
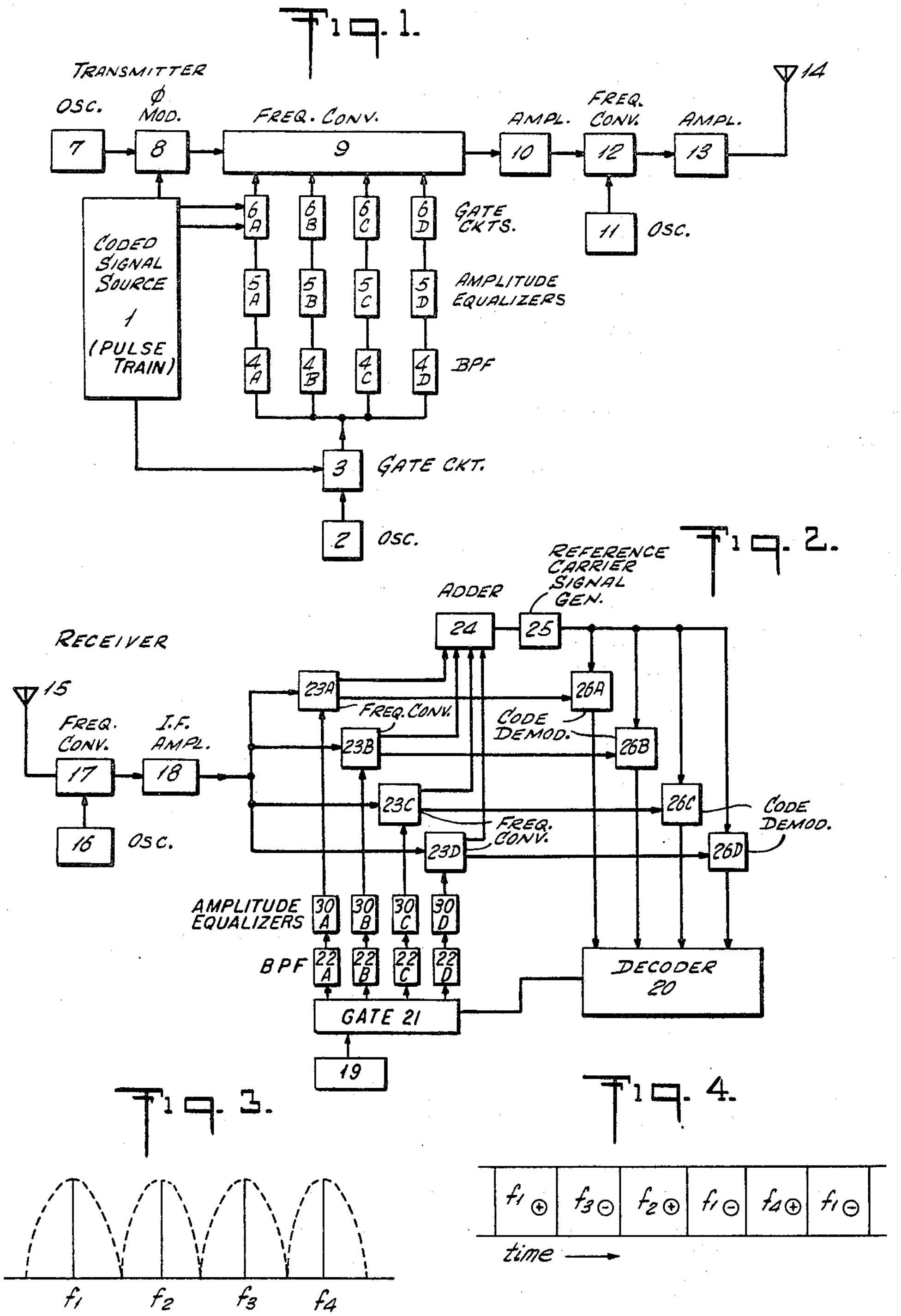
Figure 5:
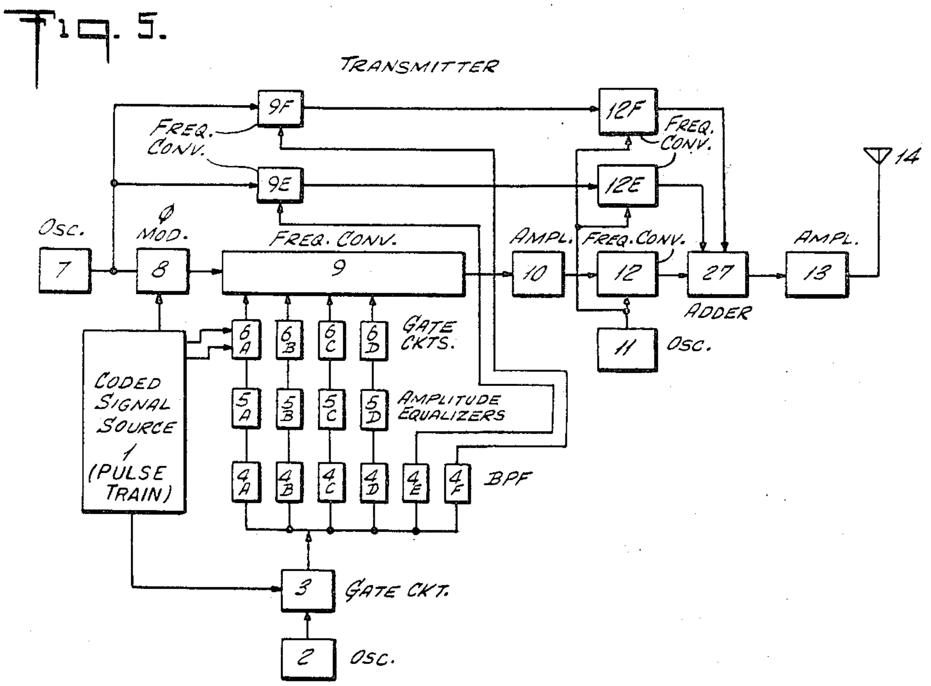
Figure 6:
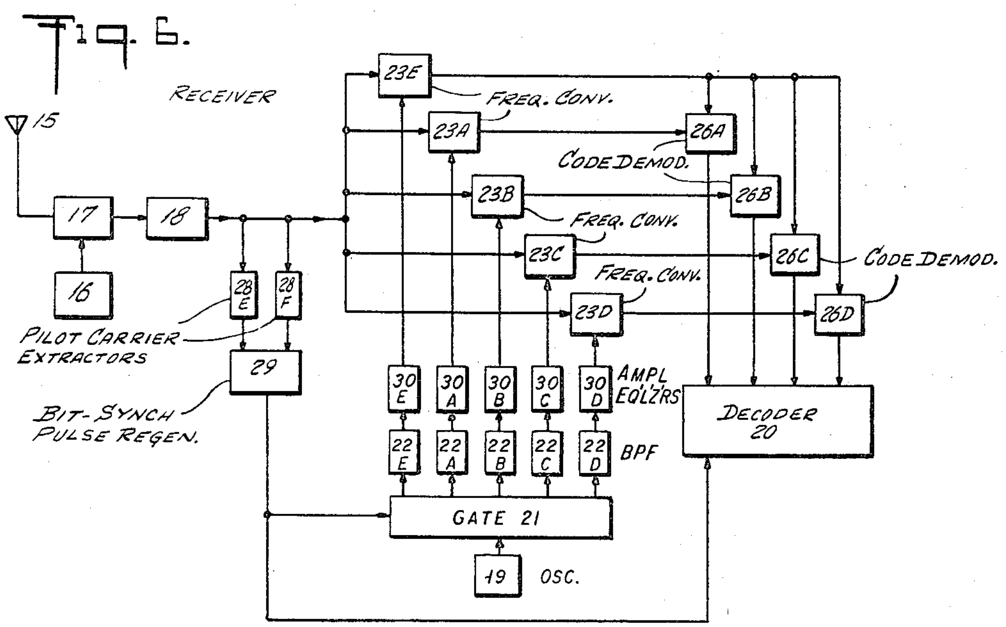
Figure 7:
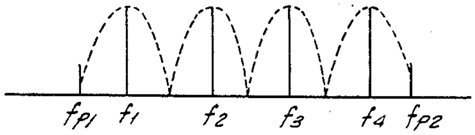

FIG. 1 shows in principle a transmitter of a first embodiment of the FSK–PM code transmission system of the invention, FIG. 2 shows in principle a receiver of the first embodiment of the FSK–PM code transmission system of the invention, FIG. 3 illustrates the principle of the frequency arrangement for the first embodiment, FIG. 4 illustrates the principle of the formation or makeup of the modulated wave radiated from the transmitter antenna in accordance with the first embodiment of the invention, FIG. 5 shows a transmitter of a second embodiment of the FSK–PM code transmission system of the invention, FIG. 6 shows a receiver of the second embodiment, and FIG. 7 illustrates the principle of the frequency arrangement for the second embodiment of the invention.

In the further description of the invention, reference is made to clock pulses and to other pulses derived from the clock pulses, however, it will be appreciated that such pulses are merely exemplary of any suitable pulse train that may be employed.

In accordance with the invention, there is provided a code transmission and receiving system wherein FSK transmission is carried out with two or more carrier frequencies. The transmitter includes means for amplitube-modulating a first carrier wave by a clock pulse train to produce a pulse series to be transmitted; alternatively, the pulse train may comprise pulses obtained by frequency multiplication or frequency division of the clock pulse train. The output of the amplitude modulating means includes the first carrier wave, higher harmonics thereof, and side-band components. The transmitter further includes means for developing or extracting a plurality of carrier waves from the output of the amplitude modulating means. Also provided in the transmitter are means for substantially equalizing the amplitudes of the extracted carrier waves, means for effecting FSK modulation of the equalized carrier waves, means for effecting PSK modulation of a second carrier wave in synchronism with the FSK modulation, and frequency conversion means for receiving the FSK-modulated and the PSK-modulated waves to produce a resultant FSK–PM-modulated wave for transmission.

The receiver includes means for amplitude-modulating a third carrier wave generated independently of the first carrier wave generated in the transmitter, by pulses which are in synchronism with the pulses employed for amplitude modulation in the transmitter. The output of the receiver amplitude-modulating means includes the third carrier wave, higher harmonics thereof, and side-band components. The receiver further includes means for continuously extracting from the output of the receiver amplitude-modulating means, a plurality of carrier waves which correspond to the plurality of carrier waves in the transmitter. Also provided in the receiver are means for substantially equalizing the amplitudes of the continuously extracted carrier waves, and means for intercombining the equalized carrier waves and the received signal wave, which varies in frequency with time, to derive a wave of a constant frequency for demodulating the received FSK–PM-modulated wave. Thus, means are provided to continuously send out one or a plurality of carrier waves in a manner so that a reference signal for synchronism detection can be derived therefrom, or to transmit the codes, not by FSK–PM modulation, but by FSK–PM–AM or FSK–AM or similar modulation.

By the use of combined code modulation of the type referred to above, whereby a plurality of codes is transmitted as a single code, it becomes possible to reduce the transmission speed of the codes to increase the radiated power of the single code, and consequently to markedly improve the sensitivity of reception. It further becomes possible with, for example, the combination of FSK among four frequencies and PSK of two phases, to achieve a pulse width three times wider than that obtainable when only two phase PSK modulation is employed. This is of considerable advantage in the required frequency band of operation and contributes to the improved sensitvity.

Referring now to FIG. 1, which illustrates in principle a transmitter of one embodiment of the FSK–PM code transmission system of the invention, a pulse train, which may be clock pulses or pulses obtained by frequency multiplication or division thereof, is produced at the output of a coded signal source 1 are applied to a gate circuit 3 for amplitude-modulating a first carrier wave generated by an oscillator 2. The output of the gate circuit 3 contains this first carrier wave, harmonics thereof, and side-band components having a frequency difference determined by the repetition frequency of the pulses supplied from the signal source 1. From this output, particular side-band components are extracted or selected by band-pass filters 4A, 4B, 4C, and 4D, respectively, to provide a plurality of carrier waves of different frequencies. Although four filters are illustrated in the drawing to provide four carrier waves, it should be noted that the number is determined by the number of the carrier frequencies to be employed. Amplitude equalizers 5A, 5B, 5C, and 5D also include amplifiers, if desired, and are used for equalizing the amplitudes of the four carrier waves. Gate circuits 6A, 6B, 6C, and 6D perform FSK modulation by pulses in the output of the coded signal source 1 which carry the information to be transmitted.

A second oscillator 7 is also provided in the transmitter in addition to the oscillator 2. The pulses in the output of the coded signal source 1 which carry the information to be transmitted and which are synchronized with the FSK modulation are supplied to a phase modulator 8 to continuously perform PSK modulation therein. A frequency converter 9 carries out frequency conversion of the PSK-modulated wave and the FSK-modulated waves to derive as the converted output an FSK–PM-modulated wave. An amplifier 10 amplifies a selected one of the upper and the lower side-band components derived by the frequency conversion. The amplified wave is supplied, together with the output of a transmitter local oscillator 11, to another frequency converter 12, to be frequency-converted. The resulting wave is then amplified by a power amplifier 13 and radiated by a transmitter antenna 14.

Referring now to FIG. 2, which illustrates in principle a receiver of one embodiment of the FSK–PM code transmission system of the invention, the signal wave received by a receiver antenna 15 is frequency-converted by means of a first receiver local oscillator 16 and a frequency converter 17, and then amplified to a desired level by an intermediate-frequency amplifier 18. The output of a second receiver local oscillator 19 undergoes similar signal treatment as was performed on the output of the oscillator 2 in the transmitter, to produce receiver local-oscillation waves having a predetermined frequency difference. More particularly, clock pulses or pulses obtained by frequency multiplication or division thereof in the output of a decoder 20, which are in synchronism with the corresponding clock pulses in the transmitter, are supplied to a gate circuit 21. The latter circuit provides amplitude modulation therein to produce in the output thereof a third carrier wave and side-band components which have a frequency difference determined by the repetition frequency of the pulses supplied from the decoder 20 and which is the same as that in the transmitter.

From the third carrier wave and the side-band components, particular side-band components are selected or extracted by band-pass filters 22A, 22B, 22C, and 22D corresponding to the transmitter to provide a plurality of carrier waves as in the transmitter. These carrier waves are then amplitude equalized by equalizers 30A, 30B, 30C and 30D similar to those in the transmitter, and fed to frequency converters 23A, 23B, 23C, and 23D, respectively, which produce the respective code-modulated waves sent from the transmitter. Although the radio-frequency radiated signal wave is not specifically synchronized, the outputs of the respective converters are of the same frequency. Moreover, if the modulation is not phase modulation of the same phase, provision is made so that the carrier waves for the FSK modulation performed in the transmitter and the receiver do not undergo any independent phase rotation in the circuits which select or extract these carrier waves, and provision is also made for the amplifiers to be of sufficiently wide band. As a consequence, the outputs of the frequency converters 23A, 23B, 23C, and 23D are of the same phase, if the received signal wave is not PSK-modulated.

When FSK modulation is effected in the transmitter, although it may not be definite which of the carrier waves is being used, still a continuous wave of a constant frequency is derived from an adding circuit 24 by selecting signal portions from the outputs of the various frequency converters 23A, 23B, 23C, and 23D and summing up such portions in such adding circuit. Buffer amplifiers or the like, not shown, are advantageously disposed between the respective inputs and the common output of the adding circuit 24.

After the continuous wave has been obtained, a reference carrier wave for phase synchronization detection may be obtained in any conventional manner, even though the continuous wave may be PSK-modulated. Thus, a reference signal generator 25 is provided for demodulation which, in the case of two-phase PSK modulation, performs frequency doubling and then frequency halving. Code demodulators 26A, 26B, 26C, and 26D demodulate the respective FSK–PM-modulated waves by means of synchronization detection between them and the reference signal. The demodulated signals thus obtained are PSK and FSK signals and are supplied to the decoder 20 through conventional discriminating circuits. Thus, synchronization detection is achieved for an FSK–PM-modulated wave which is discontinuous as to frequency, thereby providing a superior code transmission system.

Referring now to FIG. 3, which illustrates the principle of the frequency arrangement for the above first embodiment of the invention, $f_1$, $f_2$, $f_3$, and $f_4$ represent the plurality of carrier waves which are generated by the transmitter means illustrated in FIG. 1. The carrier waves are FSK-modulated and are spaced by a common frequency difference determined by the repetition frequency of the clock pulses or pulses derived by frequency multiplication or division thereof.

FIG. 4 shows in principle the form or makeup of the modulated wave from the output of the transmitter of the above first embodiment of the invention. This figure illustrates that the signal wave has undergone FSK–PM modulation at predetermined time intervals. Thus, $f_1\oplus$ for example, indicates that the positive phase of the carrier wave of frequency $f_1$ illustrated in FIG. 3 is transmitted within a certain time interval, $f_3\ominus$ indicates that the negative phase of the carrier wave $f_3$ is transmitted in the subsequent time interval, and so on. It will be appreciated, therefore, that by means of this technique, it becomes possible to modify in various ways a code transmission system wherein FSK and PSK are combined.

Referring next to FIG. 5, which illustrates the principle of a transmitter of a second embodiment of the invention according to FSK–PM code transmission, further band-pass filters 4E and 4F are provided to additionally derive pilot carrier waves. These pilot carrier waves are subsequently frequency-converted in frequency converters 9E and 9F, respectively, by the second carrier wave generated by the oscillator 7, before it undergoes PSK modulation. Another set of frequency converters 12E and 12F are provided to receive, respectively, the frequency-converted pilot carrier waves from the outputs of the converters 9E and 9F. The outputs from the converters 12E and 12F are combined in an adding circuit 27 with the FSK–PM-modulated wave from the frequency converter 12. The resulting output is then amplified by the power amplifier 13 and fed to the antenna 14 for transmission thereof. It is to be noted that the pilot carrier waves are preferably transmitted at lower levels than the FSK–PM-modulated wave so as not to reduce the transmitted power of this latter wave.

Referring now to FIG. 6, which illustrates a receiver of the second embodiment of the FSK–PM code transmission system of the invention, pilot carrier wave extractors 28E and 28F, which may be band-pass filters, extract from the received signal wave the pilot carrier waves which are continuously received, and supply them to a bit-synchronizing-pulse signal regeneration circuit 29. This regeneration circuit 29 produces, by interdetection of the two pilot waves, a sinusoidal wave whose frequency is equal to the repetition frequency of the transmitter clock pulses or an integral multiple or submultiple thereof. The regeneration circuit 29 also regenerates pulses, by frequency multiplication or division of the sinusoidal wave, which are in synchronism with the pulses used in the transmitter in producing the carrier waves for FSK modulation. A band-pass filter 22E is further provided and is used in corresponding manner as the filters 4E and 4F in the transmitter in deriving the pilot carrier waves. Another amplitude equalizer 30E, similar to those indicated by the numerals 30A–30D in FIG. 2, is connected to feed the filter 22E. An additional frequency converter 23E converts the frequencies of the pilot carrier waves being continuously received, and supplies its output to the demodulators 26A, 26B, 26C, and 26D as the reference signal for synchronization detection employed in demodulation. The pilot carrier, being a continuously transmitted wave, serves as a reference signal for synchronization detection employed in demodulation and makes it possible to carry out synchronization detection of the FSK–PM-modulated wave. A portion of the output of the bit-synchronizing-signal regeneration circuit 29 is supplied to the decoder 20 to provide the bit-synchronizing pulses.

FIG. 7 illustrates the princple of the frequency arrangement for the second embodiment of the FSK–PM code transmission system of the invention. In this figure, $f_1$, $f_2$, $f_3$, and $f_4$ indicate the plurality of carrier waves to be FSK-modulated, and $f_{p1}$ and $f_{p2}$ are pilot carrier waves, these waves being generated by the transmitter means shown in FIG. 5. The frequency difference is determined, as in the case of FIG. 3, by the repetition frequency of the transmitter clock pulses or an integral multiple or submultiple thereof.

It will be appreciated that FSK–PM–AM code transmission can also be carried out by interposing between the oscillator 7 and the phase modulator 8 shown in FIG. 5 an amplitude modulator so that an FSK–PM–AM wave will eventually be produced in synchronism with the coded signal for effecting the FSK–PM modulation, and by further adding to the code demodulators 26A, 26B, 26C, and 26D of the receiver in FIG. 6 synchronization detectors for the amplitude-modulated waves, respectively.

While the invention has been explained in connection with specific embodiments thereof, it should be clearly understood that the invention is not restricted to such embodiments and that various modifications may be made without departing from the spirit or scope of the invention. Furthermore, it will be appreciated that only those parts having direct relationship with the invention have been explained in conjunction with the described embodiments, the various other circuits employed in an operating system being well known to those skilled in the art.

What is claimed is:

1. A code transmission and receiving system for frequency-shift-keying transmission which employs at least two carrier frequencies, comprising a transmitter, said transmitter including:

means for amplitude-modulating a first carrier wave by a pulse train for a pulse series to be transmitted, means for extracting a plurality of carrier waves from the side-band components, said first carrier wave, and the higher harmonics thereof produced on the output side of the amplitude-modulating means, means for substantially equalizing the amplitudes of the extracted carrier waves, means for effecting frequency-shift keying of the equalized carrier waves, means for effecting phase-shift keying of a second carrier wave in synchronism with the frequency-shift keying, and means for sending out the resulting frequency-shift-keying-phase-modulated wave;

and a receiver, said receiver including:

means for amplitude-modulating a third carrier wave generated independently of said first carrier wave generated in the transmitter, by pulses which are in synchronism with the pulses used for the amplitude modulation in the transmitter, means for continuously extracting a plurality of carrier waves corresponding to the plurality of transmitter carrier waves, from the side-band components, the independently generated third carrier wave, and the higher harmonics thereof produced on the output side of the receiver amplitude-modulating means, means for substantially equalizing the amplitudes of the continuously extracted carrier waves, and means for intercombining the equalized carrier waves and the received wave which varies in frequency with time, to derive a wave of a single frequency for demodulating the received frequency-shift-keying-phase-modulated wave.

2. A code transmission and receiving system wherein codes are transmitted by frequency-shift-keying phase modulation among at least two carrier frequencies together with pilot carrier waves, comprising a transmitter, said transmitter including:

means for amplitude-modulating a first carrier wave by a pulse train for a pulse series to be transmitted, means for extracting a plurality of carrier waves for frequency-shift-keying and at least one pilot carrier wave to be transmitted continuously, from the side-band components, said first carrier wave, and the higher harmonics thereof produced on the output side of the amplitude-modulating means, means for effecting frequency-shift-keying of the extracted carrier waves, means for effecting phase-shift-keying of a second carrier wave in synchronism with the frequency-shift-keying, and means for sending out the frequency-shift-keying-phase-modulated wave and the pilot carrier wave which is not modulated;

and a receiver, said receiver including:

means for amplitude-modulating a third carrier wave generated independently of said first carrier wave generated in said transmitter, by pulses which are in synchronism with the pulses used for the amplitude modulation in said transmittter, means for continuously extracting a plurality of carrier waves corresponding to the plurality of transmitter carrier waves, from the side-band components, the independently generated third carrier wave, and the higher harmonics thereof produced in the output of the receiver amplitude-modulating means, means for substantially equalizing the amplitudes of the continuously extracted carrier waves, means for intercombining the equalized carrier waves with the received frequency-shift-keying-phase-modulated carrier wave and the received pilot carrier wave to derive a wave of a single frequency, and means for effecting synchronization detection by the pilot carrier wave, of the received frequency-shift-keying-phase-modulated wave for demodulation thereof.

3. A code transmission and receiving system wherein codes are transmitted by frequency-shift-keying-phase-amplitude modulation among at least two carrier frequencies, comprising a transmitter, said transmitter including:

means for amplitude-modulating a first carrier wave by a pulse train for a pulse series to be transmitted, means for extracting a plurality of carrier waves for frequency-shift-keying and at least one pilot carrier wave to be transmitted continuously, from the side-band components, the first-mentioned carrier wave, and the higher harmonics thereof produced on the output side of the amplitude-modulating means, means for effecting frequency-shift-keying of the extracted carrier waves, means for effecting phase-shift keying and amplitude modulation of a second carrier wave in synchronism with the frequency-shift-keying to derive a frequency-shift-keying-phase-and-amplitude-modulated wave, and means for transmitting the frequency-shift-keying-phase-and-amplitude-modulated wave and the pilot carrier wave which is not modulated, and a receiver, said receiver including:

means for amplitude-modulating a third carrier wave generated independently of said first carrier wave generated in said transmitter, by pulses which are in synchronism with the pulses used for the amplitude modulation in said transmitter, means for continuously extracting a plurality of carrier waves corresponding to the plurality of transmitter carrier waves, from the side-band components, the independently generated third carrier wave, and the higher harmonics thereof produced in the output of the receiver amplitude-modulating means, means for substantially equalizing the amplitudes of the continuously extracted carrier waves, means for intercombining the equalized carrier waves, the received frequency-shift-keying-phase-and-amplitude-modulated wave, and the received pilot carrier wave to derive a wave of a single frequency, and means for effecting synchronization detection by the pilot carrier wave, of the received frequency-shift-keying-phase-and-amplitude-modulated wave for demodulation thereof.

4. A transmitter for a frequency-shift-keying code transmission system which employs at least two carrier waves, comprising means for amplitude-modulating a first carrier wave by a pulse train for a pulse series to be transmitted, means for extracting a plurality of carrier waves from the side-band components, said first carrier wave, and the higher harmonics thereof produced on the output side of the amplitude-modulating means, means for substantially equalizing the amplitudes of the extracted carrier waves, means for effecting frequency-shift keying of the equalized carrier waves, means for effecting phase-shift keying of a second carrier wave in synchronizism with the frequency-shift keying, and means for sending out the resulting frequency-shift-keying-phase-modulated wave.

5. A transmitter for a code transmission system wherein codes are transmitted by frequency-shift-keying phase modulation of at least two carrier waves together with pilot carrier waves, comprising means for amplitude-modulating a first carrier wave by a pulse train for a pulse series to be transmitted, means for extracting a plurality of carrier waves for frequency-shift-keying and at least one pilot carrier wave to be transmitted continuously, from the side-band components, said first carrier wave, and the higher harmonics thereof produced on the output side of the amplitude-modulating means, means for effecting frequency-shift-keying of the extracted carrier waves, means for effecting phase-shift-keying of a second carrier wave in synchronism with the frequency-shift-keying, and means for sending out the frequency-shift-keying-phase-modulated wave and the pilot carrier wave, said latter wave being unmodulated.

6. A transmitter for a code transmission system wherein codes are transmitted by frequency-shift-keying phase and amplitude modulation of at least two carrier waves, comprising means for amplitude-modulating a first carrier wave by a pulse train for a pulse series to be transmitted, means for extracting a plurality of carrier waves for frequency-shift-keying and at least one pilot carrier wave to be transmitted continuously, from the sideband components, the first carrier wave, and the higher harmonics thereof produced on the output side of the amplitude-modulating means, means for effecting frequency-shift-keying of the extracted carrier waves, means for effecting phase-shift keying and amplitude modulation of a second carrier wave in synchronism with the frequency-shift-keying to derive a frequency-shift-keying-phase-and-amplitude-modulated wave, and means for transmitting the frequency-shift-keying-phase-and-amplitude-modulated wave and the pilot carrier wave, siad latter wave being unmodulated.

7. A receiver for a frequency-shift-keying code transmission system which employs at least two carrier waves, comprising means for receiving from a transmitter a frequency-shift-keying-phase-modulated wave, means for amplitude-modulating a first carrier wave generated in the receiver, by pulses which are in synchronism with pulses used for amplitude modulation in the transmitter, means for continuously extracting a plurality of carrier waves corresponding to a plurality of transmitter carrier waves, from the side-band components, the first carrier wave, and the higher harmonics thereof produced in the output of the receiver amplitude-modulating means, means for substantially equalizing the amplitudes of the continuously extracted carrier waves, and means for intercombining the equalized carrier waves and the received wave which varies in frequency with time, to derive a wave of a single frequency for demodulating the received frequency-shift-keying-phase-modulated wave.

8. A receiver for a code transmission system comprising means for receiving from a transmitter a frequency-shift-keying phase-modulated wave and a pilot carrier wave, means for amplitude-modulating a first carrier wave generated in the receiver, by pulses which are in synchronism with pulses used for the amplitude modulation in the transmitter, means for continuously extracting a plurality of carrier waves corresponding to a plurality of transmitter carrier waves, from the side-band components, the first carrier wave, and the higher harmonics thereof produced in the output of the receiver amplitude-modulating means, means for substantially equalizing the amplitudes of the continuously extracted carrier waves, means for intercombining the equalized carrier waves with the received frequency-shift-keying-phase-modulated carrier wave and the received pilot carrier wave to derive a wave of a single frequency, and means for effecting synchronization detection by the pilot carrier wave, of the received frequency-shift-keying-phase-modulated wave for demodulation thereof.

9. A receiver for a code transmission system comprising means for receiving from a transmitter a frequency-shift-keying-phase-and-amplitude modulated wave and a pilot carrier wave, means for amplitude-modulating a first carrier wave generated in the receiver, by pulses which are in synchronism with pulses used for the amplitude modulation in the transmitter, means for continuously extracting a plurality of carrier waves corresponding to a plurality of transmitter carrier waves, from the side-band components, the first carrier wave, and the higher harmonics thereof produced in the output of the receiver amplitude-modulating means, means for substantially equalizing the amplitudes of the continuously extracted carrier waves, means for intercombining the equalized carrier waves, the received frequency-shift-keying-phase-and-amplitude-modulated wave, and the received pilot carrier wave to derive a wave of a single frequency, and means for effecting synchronization detection by the pilot carrier wave, of the received frequency-shift-keying-phase-and-amplitude-modulated wave for demodulation thereof.

References Cited

UNITED STATES PATENTS

| | | | |
|---|---|---|---|
| 2,692,330 | 10/1954 | Kahn | 178—66 X |
| 2,855,330 | 10/1958 | Schabauer | 325—20 |

ROBERT L. GRIFFIN, *Primary Examiner.*

W. E. COOK, *Assistant Examiner.*